June 14, 1966 L. M. EDWARDS 3,256,479

AUTOMATIC PROGRAMMED CIRCUITRY AND INSTRUMENTATION FOR WELL LOGGING AND SERVICING

Filed Oct. 24, 1962 4 Sheets-Sheet 1

INVENTOR.
LYMAN M. EDWARDS
BY
Mason, Kolehmainen, Rathburn and Wyss
ATTORNEYS.

INVENTOR.
BY LYMAN M. EDWARDS
Mason, Kolehmainen, Rathburn and Wyss
ATTORNEYS

June 14, 1966 L. M. EDWARDS 3,256,479

AUTOMATIC PROGRAMMED CIRCUITRY AND INSTRUMENTATION FOR WELL LOGGING AND SERVICING

Filed Oct. 24, 1962 4 Sheets-Sheet 3

INVENTOR.
LYMAN M. EDWARDS
BY
Mason, Kolehmainen, Rathburn and Wyss
ATTORNEYS

INVENTOR.
LYMAN M. EDWARDS
BY Mason, Kolehmainen, Rathburn and Wyss
ATTORNEYS.

United States Patent Office 3,256,479

Patented June 14, 1966

3,256,479

AUTOMATIC PROGRAMMED CIRCUITRY AND INSTRUMENTATION FOR WELL LOGGING AND SERVICING

Lyman M. Edwards, Houston, Tex., assignor to Pan Geo Atlas Corporation, Houston, Tex., a corporation of Delaware Filed Oct. 24, 1962, Ser. No. 232,796

9 Claims. (Cl. 324—1)

This invention relates generally to new and improved apparatus for wire line services performed within a borehole and is more particularly concerned with improvements in the surface equipment of such apparatus to permit this equipment to be readily set up to perform different services or combinations of services without requiring extensive wiring and patching.

Over the past several years the number of different logging operations and other services performed within a drilled hole has grown to between twenty and thirty with the end not yet in sight. A wire line service company offering to perform these operations and services may be called upon to provide any one of those available or different combinations thereof. Trucks are used to transport the tools, surface panels, cable and power supplies to the borehole site and to provide motive power for lowering the several thousand feet of cable and complex instruments required to make the log or perform the other subsurface operations desired. These trucks are large and very expensive especially when fully equipped to carry out their intended functions. Thus, it is not feasible to provide a separate truck for carrying out each logging operation or service to be performed because to do so would require an excessive capital investment in equipment. Moreover, separate operating crews would have to be provided for each such truck with a consequent increase in manpower. Prior to the present invention, general practice has been to maintain one truck for a particular group of services, another truck for a second group and so on. Generally, where a customer desires a combination of services this combination will fall within a single one of the groups so that only one truck need be dispensed to the borehole site. However, in those rare instances where a combination is requested having services falling within more than one group, several trucks must be sent to the borehole site although not necessarily at the same time. Thus, the prior practice results in many of the disadvantages discussed above in that it requires use of a large number of trucks and operating crews. In addition, since each truck is equipped to perform a group of operations and since the logging company may be called upon to perform any one of these operations or different combinations thereof some provision must be made for rendering the equipment effective to perform only the particular operation or operations required before dispatching the truck to the borehole site. In equipment used prior to the present invention this is accomplished by wiring or patching the various units on the truck in such manner that only the desired ones are rendered effective. However, this wiring or patching is a laborious and time consuming task and due to its complexity can be performed only by highly skilled personnel. Since the task must usually be performed prior to each dispatch of the truck it becomes burdensome upon the efficiency of operation.

The present invention, therefore, has for a primary object the provision of new and improved surface equipment which permits a single truck to be rendered effective to perform any of the different borehole operations required or various combinations of these operations.

Another object of the invention is to provide surface equipment of the type described above which can be easily and quickly rendered effective to perform the desired operations without requiring changes in wiring, insertion of patch connections between the different units and the like.

A further object of the invention is to provide well servicing equipment which can be conditioned to perform desired services for field operation much more rapidly, more dependably and more efficiently than equipment heretofore available.

The invention has for a further object the provision of surface equipment for well services in which all equipment necessary for each type of service is constructed in a compact, separate unit or panel containing its own permanently programmed circuitry.

A still further object of the present invention is to provide a new and improved drawer type support for the individual units or panels to facilitate the assembly.

Still another object of the invention is to provide surface equipment including a new and improved drawer of the type referred to above which is effective to automatically complete the circuits necessary for performing the desired well services when the panel is placed in position, thus providing a simple, foolproof assembly operation.

The invention has for another object the provision of a drawer support or rack of the type mentioned which is provided with new and improved means for completing connections between male and female connectors, one of which is carried by the drawer, by applying a controlled predetermined force thereon so that a firm, positive connection is obtained without the possibility of applying severe forces to break the connectors or components thereof.

Yet another object of the invention is to provide surface equipment of the type described above wherein the individual units or panels are of the same size and shape so that they can be assembled on the drawer support or supports interchangeably with only the panels required for the desired services being activated by the circuit connections to the drawers.

It is also an object of the present invention to provide surface equipment constructed and arranged to permit the addition of new logging services which are not yet developed so that the new services can be integrated with existing equipment.

The foregoing and other objects are realized, in accordance with the present invention, by providing surface equipment including a multigalvanometer oscillographic recording camera and a prewired support frame or electronic rack containing a plurality of compartments for receiving various panels or units which are also prewired. The panels include a power control unit, a D.C. power supply, an A.C. voltage regulator, a cable conductor unit, a monitoring oscilloscope, a programming panel and a delay panel all assembled in predetermined positions on the support frame. The power units furnish power for the circuits of the surface unit and for the downhole instrument which is connected through a cable to the cable conductor unit. When using a downhole instrument where several different parameters are measured and recorded simultaneously as a function of borehole depth the measuring devices or transducers are not physically located at the same depth. In order to correlate the information depicted on the record with respect to depth it is necessary to store the signals from the measuring devices at one end of the downhole instrument (the upper end if the log is being made during raising of the instrument) for a time interval and then to reproduce these signals at a time coinciding with the arrival of the lower measuring device at the same depth point. The delay unit performs this function.

The frame also supports a pair of master drawers or carriages each having a connector board or terminal set thereon connected electrically to the other units on the frame. Each of the drawers is adapted to carry a prewired panel or unit containing its own programmed circuitry necessary for carrying out a particular well service or operation. Thus, several such panels are provided but only those inserted into the two master drawers are effective, the remaining panels being stored in other compartments of the electronic rack. Each panel carries a connector set adapted to mate with the drawer connector when the panel is moved into position so that the circuits are automatically completed in a rapid, foolproof manner. The connectors on the panel and the drawer are moved into engagement by a sliding rack operated by a hand crank which applies just enough force to complete the engagement. Since the connector boards are accurately aligned before the crank is turned the male and female terminal members slide directly into engagement without turning or twisting and without applying excessive force, thus preventing damage to the terminals or connector plugs.

The programming panel is also prewired to the other units on the electronic rack but it includes a front panel connector for receiving different plugs corresponding to the desired service or services. Thus, the particular programming plug used corresponds with the panel or panels assembled on the master drawers. No other connections such as clips, leads, cables, patches, etc., are required and, as a result, the surface equipment can be quickly and effectively rendered operative to perform the desired service or combination of services. The entire assembly operation can be completed in just a minute or two as contrasted with the much more cumbersome procedure of the prior art discussed above.

The invention, both as to its organization and manner of operation, together with further objects and advantages will best be understood by reference to the following detailed description taken in conjunction with the accompanying drawings wherein.

Figure 1:
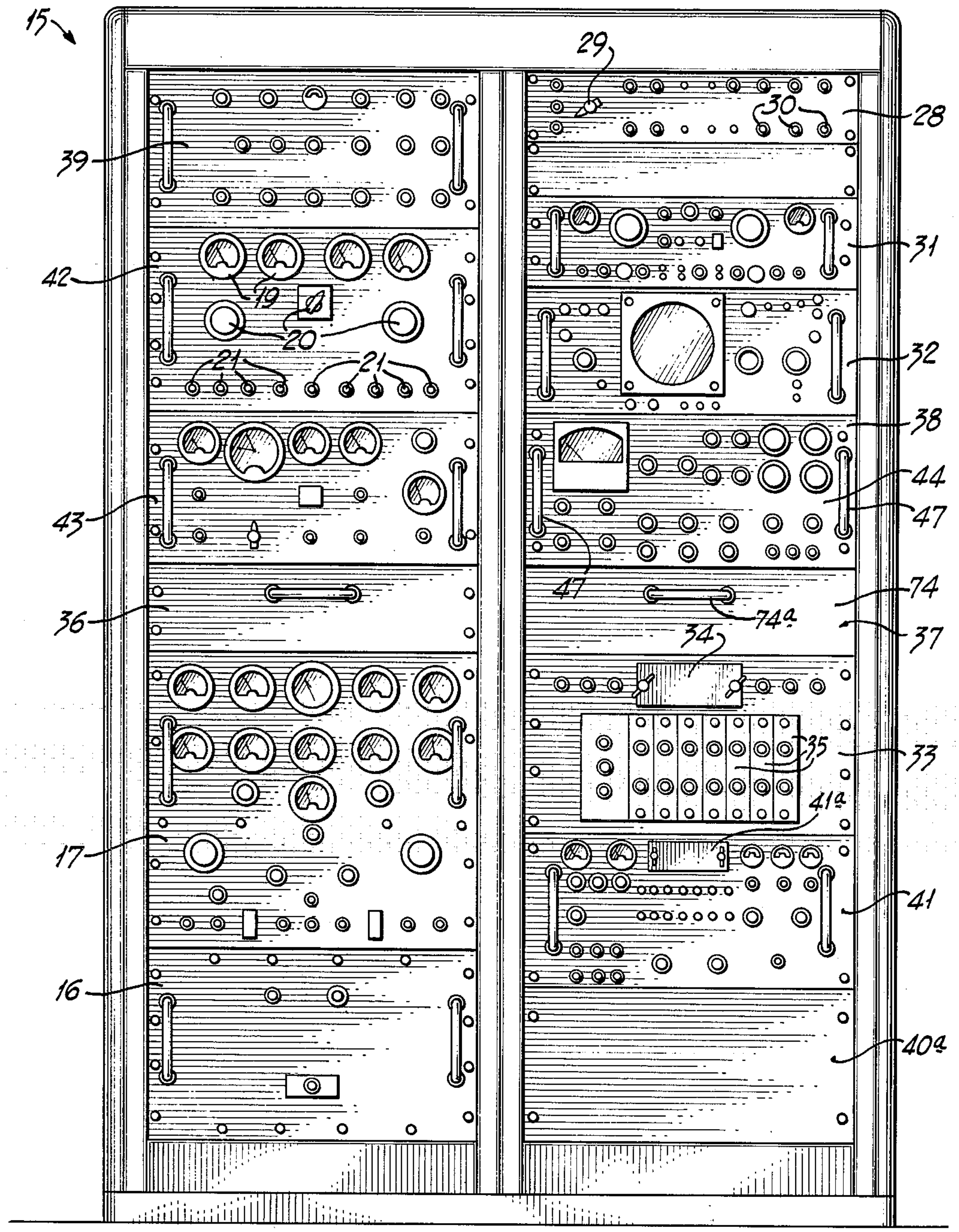
FIG. 1 is a front elevational view of an electronic rack used in the surface equipment and characterized by the features of the present invention.
Figure 2:
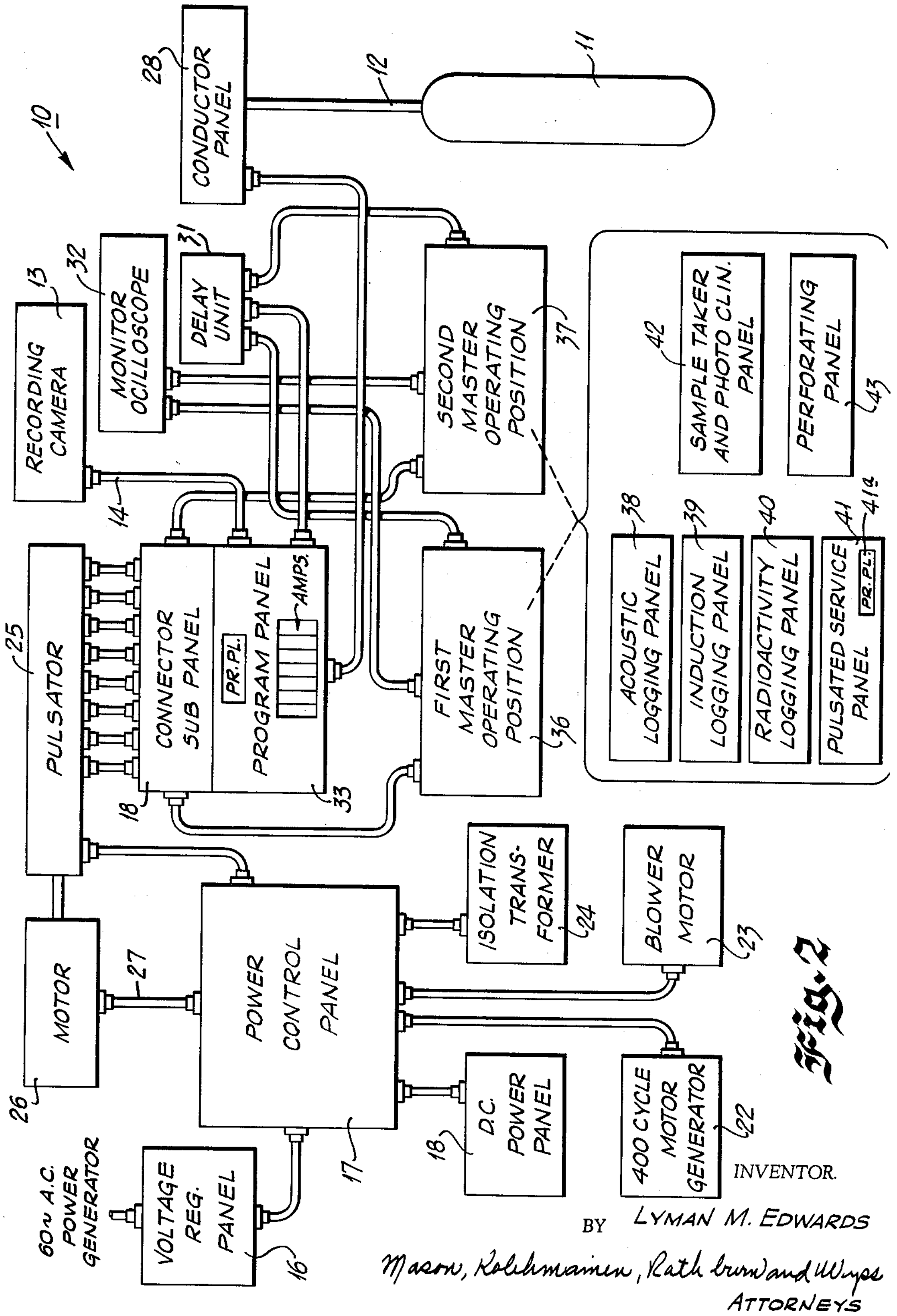
FIG. 2 is a schematic diagram illustrating the connections between the various units of the electronic rack shown in FIG. 1, the recording camera and the cable connected to the downhole instrument.

Referring now to the drawings and first to FIG. 2 thereof, surface equipment constructed in accordance with the present invention is there identified generally by the reference number 10 and is adapted to be connected to a downhole tool 11 through a cable 12 preferably containing a plurality of inner conductors. A six conductor cable is preferred. The surface equipment 10 is carried by a truck or van (not shown) which also carries suitable apparatus including a power driven sheave and storage reel for paying out and taking up the cable to lower and raise the tool 11 within a borehole (also not shown). The surface equipment includes a conventional recorder 13 which may be of the multigalvanometer oscillographic camera type for producing several traces on a film. The film is driven in synchronism with the movement of the tool 11 within the borehole so that the traces depict recorded information as a function of the tool depth. The recording camera 13 is connected via a cable 14 to an electronic rack 15 (FIG. 1) which is, in effect, a frame or cabinet containing a number of compartments or storage areas for a plurality of prewired panels or units. The electronic rack is also prewired to provide connections between the various panels or units and between these units and the cable 12 and recording camera 13. The details of the wiring are not illustrated and will not be described since the manner in which the units are connected will become obvious to one skilled in this art from the ensuing description.

The units supported on the rack 15 include an A.C. voltage regulator 16 supplied with 60 cycle power from an A.C. generator (not shown) driven from a gasoline engine on the truck. The regulated 60 cycle output of the unit 16 is supplied through the prewiring referred to above to a power control panel 17 which may also be supplied with D.C. power from a panel 42. The panel 42 provides tapped and regulated D.C. voltages from 45 volts to 360 volts and includes a plurality of meters 19, control knobs 20 and test jacks and switches 21 for controlling and measuring currents and voltages in the D.C. power supply. To the same end, the panel 17, also includes a set of measuring instruments, controls, test plugs and switches for adjusting and measuring frequency, amplitude, etc., for all power signals delivered by the panel. The panel 17 is also supplied from a source 22 with 400 cycle power, which is required for some services performed in the borehole. The panel 17 includes a blower motor 23 for cooling purposes and an isolation transformer 24 to isolate the different A.C. power signals. In addition, the panel 17 is supplied with pulsated or commutated D.C. power from a pulsator 25 driven by a motor 26 which is in turn excited by 60 cycle power supplied from the panel 17 via a connector 27.

Also mounted on the electronic rack 15 is a conductor panel 28 connected to the cable 12 and including a power switch 29 movable to three different positions, namely a "power off" position wherein power is removed from the cable and all cable conductors are shorted and grounded so that the cable or downhole tool can be safely handled or repaired, a "standby" or "test" position position where the cable conductors are open but no power is supplied from the rack 15 although power from a continuity tester or the like could be applied so that no detonator should be connected to the cable, and a "power on" position wherein all of the cable conductors are connected to the rack 15 and the supply voltages to the tool 11 and the return signals from downhole can be measured. A test jack 30 is supplied for each cable conductor to permit the measurements. Indicating lights are provided to show the power condition on the cable in order to avoid injury to the operating crew by inadvertent operation of the detector, inadvertent supply of high voltages or the like.

A delay unit 31 is prewired to the electronic rack 15 and supplied with signals from the transducer or transducers of the downhole tool 11 in order to store these signals for subsequent reproduction. More specifically, when signals are being collected by transducers located at opposite ends of the tool 11 for supply to the recording camera 13 to produce separate traces respectively representing the collected information, it is apparent that the traces will not be correlated with respect to borehole depth if the signals are recorded directly. The delay unit 31 thus serves to delay the signals from the transducers at one end, for example, the upper end if the tool 11 is being raised to make the log, so that these signals are reproduced at a time coinciding with the arrival of the lower transducer at the same depth point. This delay permits all signals to appear on the film from the recording camera 13 with a common depth reference even though the instruments for producing the signals may be separated physically by several feet. The delay unit 31 is a two channel delay system so that the signal from either the lower or upper transducers may be delayed or, if desired, the signals from one of the transducers can be passed through both delay channels in series to double the delay period.

An oscilloscope unit 32 is provided on the electronic rack for use as a measuring device for some logging operations, for use as a monitor scope for other operations or for use as a test oscilloscope during servicing of the electronic equipment in the rack 15. This oscilloscope unit includes the usual controls for intensity, focus, etc., and test plugs or jacks.

A programming panel 33 on the electronic rack 15 is supplied with D.C., 60 and 400 cycle A.C. and pulsated power from the panel 17, the pulsator 25, etc. The connections from the panel 17 and the pulsator 25 are first made to a connector subpanel or strip 18 shown in FIG. 2 which is connected by a first multiple conductor cable **36*a* to a first master operating position 36 and by a second multiple conductor cable 37*a* to a second master operating position. The subconnector strip 18 is used for convenience in wiring to avoid the necessity for running several cables to the two master operating positions. The programming panel is adapted to condition the various units of the electronic rack 15 to perform the functions required for the desired service or group of services and, to this end, it is provided with a front panel receptacle for receiving a detachable programming plug 34** which is suitably clamped in position. Several such plugs are provided and the one selected determines the manner in which the units are interconnected. Thus, each plug is provided with a number of terminals interconnected in predetermined order by wiring and these terminals mate with those of the programming panel receptacle. Each plug has on its outer face indicia indicating the type of service or combination of services that is to be performed, information concerning the calibration settings, meter readings, etc., on the other panels for that service or combination. Thus, to assemble the equipment for operation, the proper programming plug is inserted and the dials are adjusted as instructed on this plug. No wiring, patching, etc., is required.

The programming panel 33 also includes sets of plugs for receiving plug-in type amplifiers 35. Seven such amplifiers are provided but two are spares. Each amplifier provides a proper impedance match between the signal channel to which it is connected and the galvanometer of the recording camera 13 which it drives. Two or more of the amplifiers may be connected in series to provide additional drive for the galvanometer so that a full scale deflection, an overdrive or off scale deflection or a reduced scale deflection can be obtained as desired. The programming panel also includes potentiometers for shunting the different galvanometers of the recording camera so that groups of these galvanometers can be connected in series, in parallel or in various combinations. One camera 13 which has been used has eleven galvanometers and by proper adjustment of the programming potentiometers it is possible to connect any desired galvanometer to a signal channel so that a trace or curve can be recorded at any desired position on the film.

The panels, 16, 17, 28, 31, 32 and 33 are mounted in fixed positions on the rack 15 and are held in place by means of screws or the like which may be removed to permit withdrawal of the panel for servicing or replacement. The rack 15 also includes a pair of master operating positions or stations including a pair of sliding drawers 36 and 37 each adapted to receive any one of a plurality of interchangeable service panels 38, 39, 40, 41, 42, 43, etc. The latter panels are inserted on the drawers to perform the desired well service operations and only the two panels on the drawers are active. The inactive panels may be stored in the unused compartments of the electronic rack 15 and, as a consequence, all of the service panels are of the same physical size and shape. The two active panels to be placed on the drawers may also be interchanged and both can be used simultaneously to produce signals for recording by the camera 13 in response to information derived from the same downhole tool. However, switch means are provided to permit the two active panels to operate separately in response to signals respectively derived from different downhole signal collectors. The service panels include an acoustic logging panel 38 which is effective to supply signals to the recording camera 13 to develop a "cement bond" log of the type described in copending U.S. patent application Serial No. 181,859 filed March 23, 1962 by Gerald C. Summers, and assigned to the same assignee as the present invention.

As is described in the latter application a cement bond log is produced by pulsing a transmitter in the downhole tool to emit acoustic pulses which pass to a receiver spaced from the transmitter through the borehole fluid, through the well casing and through the earth formations including any cement between the casing and the borehole walls. A first signal is developed proportional to the amplitude of the energy arriving at the receiver following each pulse and this signal is recorded by the camera 13 to produce an "amplitude" curve. A second signal is developed by the panel 38 proportional to the travel time of the pulse from the transmitter to the receiver and this signal is recorded by the camera 13 simultaneously with the first one to produce a "velocity" curve alongside the amplitude curve for comparison. The panel 38 is also adapted to produce signals for recording simultaneously an amplitude curve and a "difference in amplitude" curve as described in copending U.S. application Serial No. 846,924, filed October 16, 1959 by Charles H. Thurber et al. and assigned to the same assignee as the present application. This combination is known in the art as a SATA log. The difference in amplitude curve is obtained by subtracting the amplitude of signals arriving at two downhole receivers or transducers from the same pulse. The panel 38 is also effective to provide signals for producing a conventional two receiver velocity log derived by measuring the difference in travel times of the pulse to the two downhole transducers. Thus, the panel 38 may be rendered effective to produce either the cement bond log, the two receiver velocity log or the SATA log but these logs are not run simultaneously since the customer is generally interested in only one of them for his well.

The panel 39 is effective to provide signals for driving the camera to produce an induction log like that described in detail in copending U.S. application Serial No. 773,218 filed November 12, 1958 by Henry C. Waters and assigned to the same assignee as the present invention.

The panel 40 is a radioactivity logging panel for driving the camera 13 to develop a gamma ray log and/or a neutron log in the manner described in U.S. Patents 2,740,051; 2,740,052 and 2,740,053. The panel 40 is not illustrated on the electronic rack shown in FIG. 1 but since the compartment indicated at **40*a* is blank the panel could be stored in this position whenever it is not in use on one of the drawers 36 or 37**.

The panel 41 is entitled the "pulsated service panel" since it uses the pulsating D.C. current from the pulsator 25 and power control panel 17 and provides signals for driving the galvanometers of the camera 13 to produce a dipmeter log like that described in U.S. application Serial No. 764,269 filed on October 11, 1958 by Jaques H. Castel et al. and assigned to the same assignee as the present invention. The panel 41 is also effective to drive the camera 13 to produce a group of curves like those described in U.S. Patent No. 2,779,912, a "Focuslog" like that described in U.S. application Serial No. 769,239, filed October 23, 1958, and/or a conventional temperature log or a powered sonde log. All of these various types of services are operated and controlled by the panel 41 by means of a detachable program plug 41*a* which makes use of programmed components in the panel 41 to connect the appropriate circuitry for control of the service being performed. In normal logging instrumentation a separate panel for each of these services would be required whereas with the present invention one panel serves this purpose and only interchange of programming plugs 41*a* is required to render the panel effective for the service desired.

The panel 42 is adapted to provide samples of the subsurface either of the core formations or of the liquid in the permeable layers adjacent the borehole. The unit 42 also has a photoclinometer to take photographs in the borehole to show the inclination of dip of the interfaces between adjacent layers. The sample taker and the photoclinometer are not operated simultaneously.

The panel 43 is adapted to perform perforating operations in conventional manner. Of course, the downhole tool connected to the cable 12 must correspond with the panels in the master operating positions on the drawers 36 and 37 but the downhole tool is connected to the cable by a simple plug connection and, hence, interchange of tools is not a difficult operation.

Each service panel is, of course, prewired to perform its intended functions but this wiring per se forms no part of the present invention and, hence, will not be described in detail. Each panel comprises an electronic chassis having a front panel adapted to cover the opening for one of the compartments of the electronic rack 15. The front panel supports the measuring instruments, switches, operating controls, etc., of the panel so that they are accessible to the logging crew. The chassis also includes a base for supporting the various electronic components of the panel such as the tubes, transformers, condensers, etc. The panel 38 shown in FIGS. 3, 4, 5, 6 and 7 is typical and hence, will be described in detail, it being understood that the remaining panels are of similar construction but contain different components, different wiring, etc. In any event, the front panel for the chassis of the panel 38 is identified by the reference numeral 44 while the base is indicated at 45 and has mounted at the rear thereof a connector support 46 extending from one side of the base to the other. The front panel 44 may be provided with rigid handles 47 to facilitate handling of the unit 38 as it is placed on or removed from a drawer. The support 46 carries a plurality of connector blocks 48 each having a large number of rearwardly protruding male terminals 49. Actually, the number of terminals on each block is greater than that shown in the drawings since several have been eliminated in the interest of clarity. Each block also includes a pair of rearwardly extending guide pins 50 respectively located at the opposed sides of the block. The support 46 also carries adjacent its opposed ends a pair of rigidly mounted master guide pins 51.

Turning now to the construction of the drawers 36 and 37 it should be noted that they are identical and, for this reason, only one of them, namely the drawer 37 shown in FIGS. 3 to 7, will be considered in detail. This drawer includes a support frame 50 formed by a pair of channel shaped side bars 61 suitably interconnected to form a rigid support. A pair of spaced horizontal guide rails 62 extend within the channel of each side bar to engage rollers 63 carried by the rack 15 in order to facilitate movement of the drawer into and out of the rack. A front panel or plate is secured to the side bars 61 and has a handle 74*a* thereon for use in sliding the drawer. Mounted for sliding movement upon the frame 60 is a slide assembly identified generally by the reference numeral 52 and including a flat, horizontal slide 53 having an enlarged opening 53*a* (FIGS. 3 and 5) therein to permit access to the bottom of the service panel on the drawer during servicing or checking or operating parameters (i.e. currents, voltages, oscilloscope pattern checks, etc.). The slide 53 rests upon support blocks secured to the side bars 61 and is further supported by arms 71 affixed to each side of the frame 60 and extending beneath the slide.

Figures 5, 6:
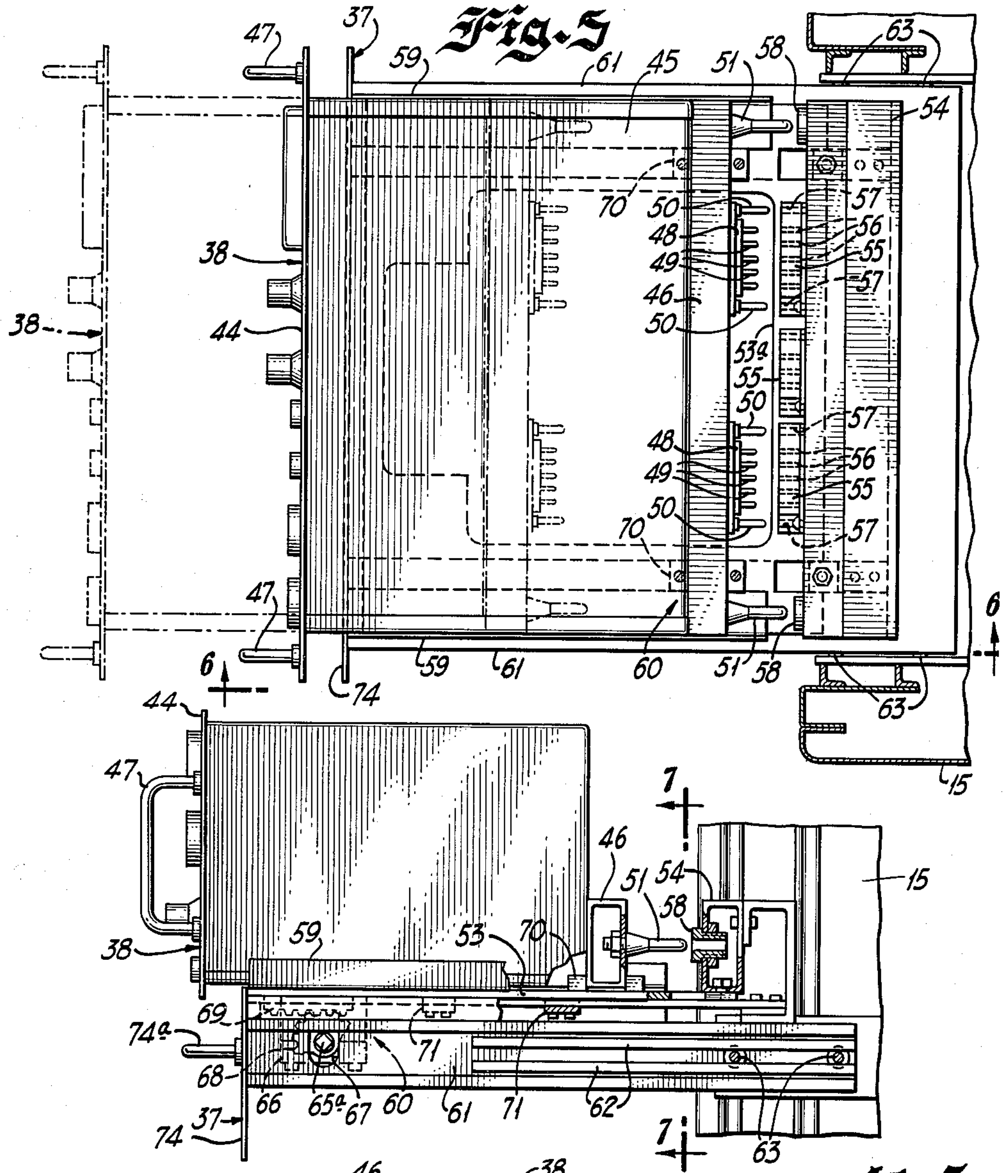
FIG. 5 is a fragmentary, top plan view of the master drawer and panel.
FIG. 6 is a fragmentary, sectional view taken along a line corresponding substantially to the line 6—6 in FIG. 5.
Figure 7:
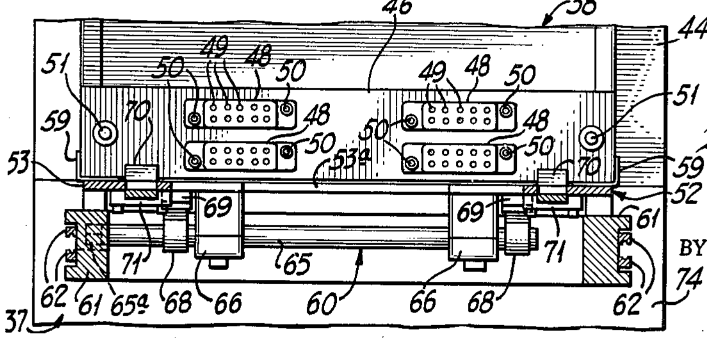
FIG. 7 is a fragmentary, sectional view taken along a line corresponding substantially to the line 7—7 in FIG. 6.

To provide electrical connections from the service panel on the drawer to the electronic rack, a connector support 54 is attached to the rearward end of the frame 60 and extends from one side of the drawer to the other. The support 54 carries a plurality of connector blocks 55 each having a large number of female terminals or receptacles 56 for receiving the male terminals 49 of one of the connector blocks 48 in order to complete electrical circuit connections therebetween. The number of blocks 55 exceeds the number of blocks 48 on any one panel since not all of the blocks 55 are used for any one service panel. It is through the use of different ones of the blocks 55 and through different wiring to the used blocks 48 on the service panel that the active panel is rendered effective to perform its intended functions. Thus, one of service panels other than the unit 38 may have its connector blocks 48 located in different positions than the blocks shown in the unit 38 but, in any event, each of the blocks 48 mates with one of the blocks 55. Each of the blocks 55 is provided with a pair of spaced openings 57 for accommodating the pins 50 on its associated block 48 to guide the blocks while they are moved into engagement and to insure proper seating of each male terminal 49 within its mating female terminal 56. As is shown in FIG. 5 the pins 50 extend rearwardly for a somewhat greater distance than the terminals 49 so that a proper alignment of the connector blocks 48 and 55 is attained before the terminals 49 and 56 are mated. In addition, the support 54 carries a pair of master guide receptacles 58 respectively located near its opposed side edges for receiving the master guide pins 51 on the panel. The master guide pins and their associated receptacles insure that the proper male and female connector blocks are mated. The blocks 48 and their male terminals are inserted into the blocks 55 and their female terminals solely by horizontal rectilinear movement and without twisting and turning, thus avoiding the possibility of twisting the terminals so that they become misaligned after frequent use. This arrangement insures that the service panels can be used over and over again without replacing the connector blocks which would be a major repair task in view of the number of wiring connections to each block. The prewired connections to the blocks 55 are made by cables extending along the rear of the electronic rack 15 and trained over rollers (not shown) which permit the cables to pass thereover and, hence, prevent twisting or entangling of the cables as the drawer is opened and closed.

Figure 3:
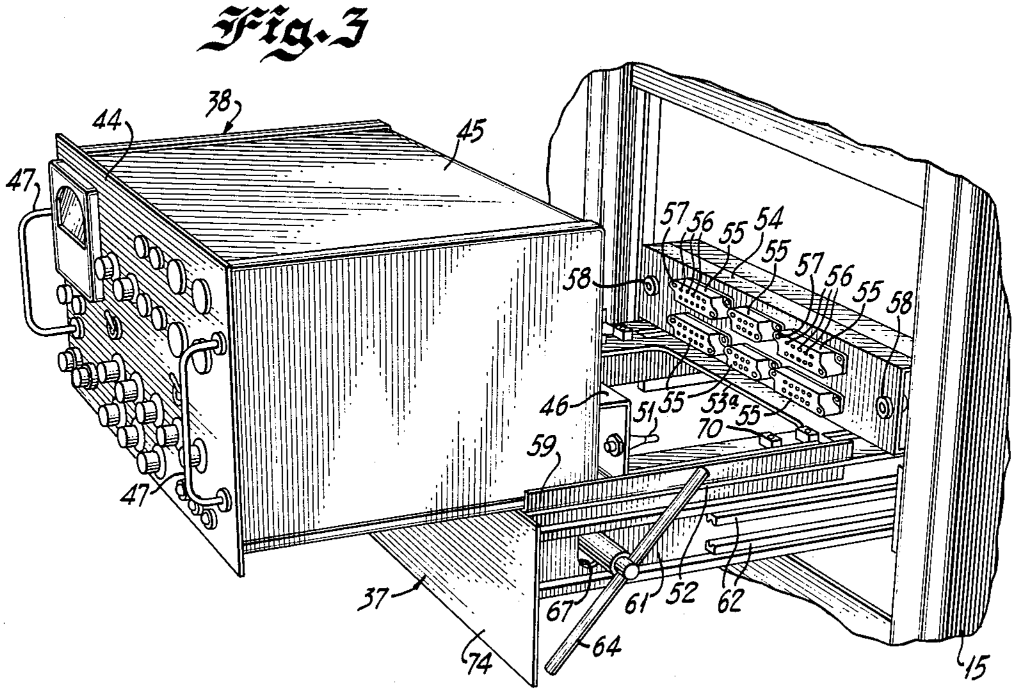
FIG. 3 is a fragmentary, perspective view illustrating one of the master drawers of the electronic rack with a logging panel in position to be assembled thereon.
Figure 4:
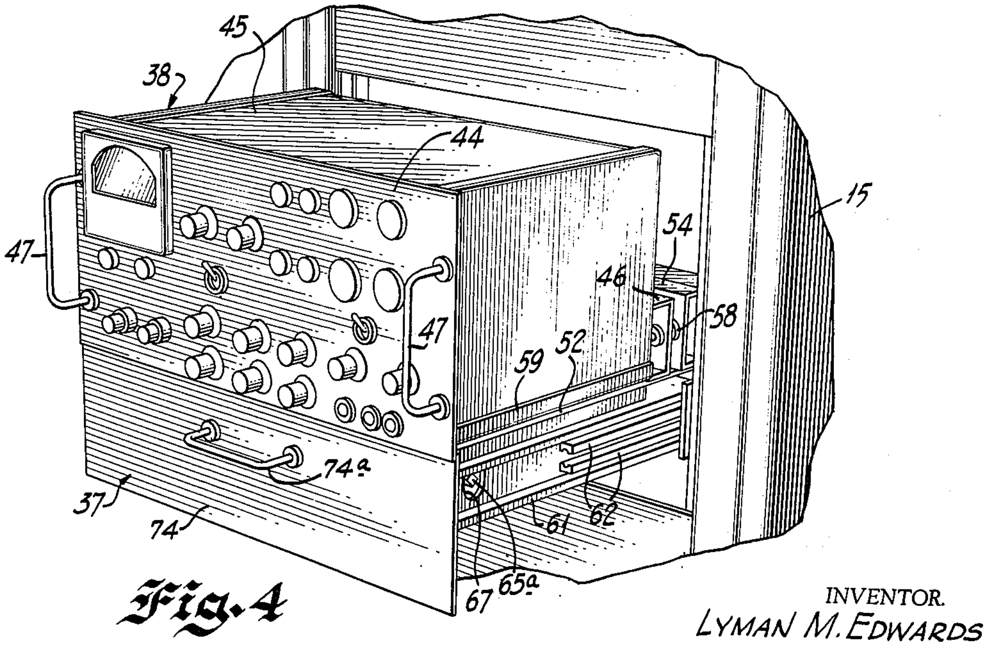
FIG. 4 is a fragmentary, perspective view somewhat similar to FIG. 3 but shows the panel moved forwardly on the master drawer.

During placement of the service panel onto the drawer, the drawer is first opened and the panel is lifted to the position shown in FIG. 3 (and in broken lines in FIG. 5) with the rear of the panel resting on the drawer. The panel is then pushed rearwardly along the drawer until it reaches the position shown in solid lines in FIG. 5 where the bottom of the panel is locked to the slide assembly 52. To this end, the slide is provided with sets of dogs 70 located at the rear and at the opposed sides of the slide 53 for engaging the panel to hold it in fixed position on the slide. A pair of L-shaped guides 59 extend along the opposed sides of the frame 60 and each has a leg extending upwardly to prevent lateral movement of the panel as it is being moved between the broken and solid line positions.

The slide assembly 52 is adapted to slide along the frame 60 to move the panel from the position shown in solid lines in FIG. 5 until the connector blocks 48 and 55 are fully mated. This sliding movement of the assembly 52 is effected by turning a hand crank 64 (FIG. 3) which has a socket for engaging the end of a shaft 65 journalled upon bearing blocks 66 attached to the frame 60. The end 65*a* of the shaft 65, as is shown in FIG. 6, is noncircular to permit turning by the crank and is accessible through an opening 67 in one of the side bars 61. The shaft 65 carries one or more gears 68 each meshing with a toothed rack 69 affixed to the underside of the slide 53. When the crank 64 is operated to turn the gear 68 in a clockwise direction as viewed in FIG. 6 the slide assembly 52 moves from left to right to first move the master guide pins 51 into the receptacles 58, to then move the connector block guide pins 50 into the openings 57 and to then engage the male terminals 49 with the female terminals 56, thus completing the circuit connections from the panel to the electronic rack 15. The crank 64 provides just enough force to insure proper engagement of the connector blocks 48 and 55 but avoids the application of excessive force which might damage the terminals or the blocks. The described arrangement also insures exact rectilinear movement of the sliding assembly 52 and the panel carried thereby in order to avoid twisting or turning of the blocks and their terminals with the advantages described above.

In view of the foregoing description it will be observed that the surface equipment 10 of the present invention can be easily and rapidly assembled to perform any type of service desired by the customer merely by placing the proper panel or panels (38, 39, 40, 41, 42 or 43) on either or both of the master drawers 36 and 37. The assembly of the panel and the circuit connections to the electronic rack are made in a simple and foolproof manner as described above and when the assembly is completed the proper circuit connections are automatically made without further plugging and unplugging and without rearranging external clips, leads, wires and cables. The drawer can be opened to permit checking or servicing without removing power from the panel because the connections between the blocks 48 and 55 are not broken by opening the drawer. Future logging equipment such as that for running a nuclear magnetic log now under development can be assembled in a panel unit of the same size as those described so that it too can be assembled on the electronic rack and integrated with the remaining circuits without difficulty. Thus, it will be observed that the equipment illustrated and described is effective to perform all of the enumerated objects of the invention.

While a particular embodiment of the invention has been described it will be apparent that many modifications and changes will readily occur to those skilled in this art and it is, therefore, contemplated by the appended claims to cover any such modifications and changes that fall within the true spirit and scope of the invention.

What is claimed as new and is desired to be secured by Letters Patent of the United States is:

1. Well servicing apparatus for use in performing a variety of functions in a borehole and comprising, a downhole tool, a cable extending through the borehole and having conductor means electrically connected to said downhole tool, surface equipment electrically connected to said conductor means, said surface equipment comprising an electronic rack having a plurality of panel receiving means, a plurality of panels mounted on said rack, connector means on said rack electrically connecting said panels, said panel receiving means and said conductor means, at least one of said panels comprising a power supply, at least two of said panel receiving means each including fixed electrical terminal means detachably engaging corresponding terminals on one of said panels, the two panels respectively engaging the latter two panel receiving means being freely removable from said rack to facilitate replacement by other panels for performing entirely different well service functions, recording means electrically connected to said connector means, and selectively and manually operable programming means providing electrical connections between said connector means, said power supply, said recording means and said cable for programming said apparatus to interconnect the downhole tool, the panels and recording means to render them effective to perform the well service functions of the two panels respectively engaging said two panel receiving means.

2. The apparatus defined by claim 1 wherein another of said panels comprises means for developing pulsated electrical power for application via said connector means to one of said panel receiving means, and wherein the panels connected to said one panel receiving means comprises means for utilizing said pulsated power.

3. The apparatus defined by claim 1 wherein said downhole tool includes at least two information collecting devices spaced vertically from each other in a direction extending longitudinally of the borehole, a further of said panels including a time delay means for providing a time delay, said two devices being electrically connected via said conductor means to said connector means and said panels, and means electrically connecting the time delay panel and a first of said devices.

4. The apparatus defined by claim 1 wherein one of said panels includes switch means electrically connected via said connector means to said power supply, means electrically connecting said conductor means and said switch means, said switch means being manually operable to different positions including an off position wherein said conductor means is disconnected from said power supply, an on position wherein said conductor means is connected to said power supply and a test position wherein said conductor means supplies test signals via said switch means and said connector means to at least one of said panels to permit a test measurement.

5. The apparatus defined by claim 1 wherein one of said panels includes means for developing a regulated alternating current voltage for supply via said connector means to one of said panel receiving means and wherein the panel connected to said one panel receiving means comprises means for utilizing said regulated alternating current voltage.

6. The apparatus defined by claim 1 wherein one of said panels contains a plurality of amplifiers excited by signals from said downhole supplied via said conductor means, and amplifiers being electrically connected via said connector means between said recording means and the panels connected to said two panel receiving means in order to provide electrical signals for driving the recording means, and means for selectively rendering different ones of said amplifiers effective so that the recording means is driven by electrical signals of desired amplitude corresponding to the well service functions provided by the two panels connected to said two panel receiving means.

7. The apparatus defined by claim 1 wherein one of said panels includes oscilloscope means electrically connected via said connector means to said two panel receiving means and to said conductors for displaying signals detected by said downhole tool.

8. The apparatus defined by claim 4 wherein one of said panels includes oscilloscope means electrically connected via said connector means to said two panel receiving means and to said conductors, said oscilloscope means being supplied with signals from said switch means when the latter is in its on position.

9. The apparatus defined by claim 6 wherein said downhole tool includes at least two information collecting devices spaced vertically from each other in a direction extending longitudinally of the borehole, a further of said panels including a time delay means for providing a time delay, said two devices being electrically connected via said conductor means to said connector means and said panels, and means electrically connecting the time delay panel and a first of said devices.

(References on following page)

References Cited by the Examiner

UNITED STATES PATENTS

| | | | |
|---|---|---|---|
| 2,707,768 | 5/1955 | Owen | 324—1 |
| 2,729,784 | 1/1956 | Fearon | 324—1 |
| 2,794,155 | 5/1957 | Jones | 317—120 |
| 2,810,118 | 10/1957 | Swan | 317—122 X |
| 3,088,054 | 4/1963 | Meyer | 317—120 |
| 3,137,212 | 6/1964 | Rose | 317—120 X |

OTHER REFERENCES

"Review of Schlumberger Well Logging and Auxiliary Methods," Schlumberger Well Surveying Corporation, Schlumberger Document Number 2, 1949, pp. 6, 7, 8, 54, 58, 70.

WALTER L. CARLSON, *Primary Examiner.*

FREDERICK M. STRADER, *Examiner.*

G. R. STRECKER, *Assistant Examiner.*